US005623312A

United States Patent [19]
Yan et al.

[11] Patent Number: 5,623,312
[45] Date of Patent: Apr. 22, 1997

[54] COMPRESSED-DOMAIN BIT RATE REDUCTION SYSTEM

[75] Inventors: Li Yan, Holmdel; Barin G. Haskell, Tinton Falls, both of N.J.

[73] Assignee: Lucent Technologies Inc., Murray Hill, N.J.

[21] Appl. No.: 361,929

[22] Filed: Dec. 22, 1994

[51] Int. Cl.$^6$ .................................................. H04N 7/18
[52] U.S. Cl. ........................... 348/416; 348/411; 348/412; 348/405; 348/409; 348/415
[58] Field of Search ................................... 348/416, 411, 348/409, 699, 404, 405, 407, 700, 402, 419

[56] References Cited

U.S. PATENT DOCUMENTS

| | | | |
|---|---|---|---|
| 5,038,209 | 8/1991 | Hang | 348/411 |
| 5,164,828 | 11/1992 | Tahara et al. | 348/405 |
| 5,173,773 | 12/1992 | Ueda et al. | 348/416 |
| 5,365,271 | 11/1994 | Asano | 348/409 |
| 5,367,336 | 11/1994 | Kustka et al. | 348/416 |
| 5,369,437 | 11/1994 | Koga et al. | 348/416 |
| 5,412,484 | 5/1995 | Yoshikawa | 348/405 |
| 5,424,777 | 6/1995 | Koga et al. | 348/415 |
| 5,440,345 | 8/1995 | Shimoda | 348/402 |
| 5,461,422 | 10/1995 | Hsieh | 348/405 |
| 5,479,211 | 12/1995 | Fukuda | 348/419 |
| 5,541,852 | 7/1996 | Eyuboglu et al. | 364/514 |

OTHER PUBLICATIONS

"Reduction of the Bit-Rate of Compressed Video While In Its Coded Form", D. G. Morrison et al., Sixth International Workshop on Packet Video, Portland, Oregon, USA, 26–27 Sep. 1994.
"Continuous Presence Video Bridging Based on H.261 Standard" by Ting-chung Chen, et al., SPIE vol. 2094, pp. 269–280.
"Understanding Personal Conferencing—PC Power: One-on-One Communications", product brochure from Intel Corporation, 1994.
"Desktop Data Conferencing" by Andrew W. Davis, Byte, May 1994, pp. 81–86.
"Voiceband Data Transmission Interface Generic Requirements", Bellcore Technical Advisory, TA–NWT–000030, Issue 3, Apr., 1992.
"Class Feature: Calling Number Delivery" FSD 01–02–1051, Bellcore Technical Reference TR–TSY–000031, Issue 3, Jan., 1990.
"Continuous Presence for H.320 Multipoint Conferences", PictureTel Corporation Committee T1 Contribution, Nov. 4, 1993.
"Description of Ref. Model 8 (RM8)", Specialist Group on Coding for Visual Telephony, CCITT SGXV Working Party XV/r, Document 525,1989.
"Draft Revised Recommendation H.261—Video Codec for Audiovisual Services at px 64kbits Submitted to the Xth CCITT Plenary Assembly", Study Group XV—Report R 95, International Telegraph and Telepone Consultative Committee (CCITT) Period 1989–1992, COM XV –R 95–E, May 1992.

(List continued on next page.)

*Primary Examiner*—Tommy P. Chin
*Assistant Examiner*—Anand S. Rao
*Attorney, Agent, or Firm*—Steven R. Bartholomew

[57] ABSTRACT

Improved bit rate reduction techniques are disclosed. When incorporated into an existing video processing system having a DCT coefficients processor, the motion vector processor disclosed herein provides enhanced computational and memory storage efficiencies over prior art designs. The motion vector processor includes a microprocessor and associated motion vector memory. The motion vector memory is adapted to store a plurality of motion vectors corresponding to at least one image frame containing a plurality of macro blocks. Each motion vector is represented by an X value and a Y value, the X value and the Y value signifying image changes within a given macro block from a given frame to the immediately preceding frame.

13 Claims, 6 Drawing Sheets

OTHER PUBLICATIONS

"Multipoint control Units for Audiovisual Systems Using Digital Channels Up to 2 Mbit/s", International Telecommunication Union, Telecommunication Standardization Sector of ITU, ITU–T Recommendation H.231 (Previously CCITT Recommendation) Mar., 1993.

"Procedures for Establishing Communication Between Three or More Audio visual Terminals Using Digital Channels Up to 2 Mbit/s", International Telecommunication Union, Telecommunication Standardization Sector of ITU, ITU–T Recommendation H.243 (Previously CCITT Recommendation). Mar., 1993.

COMPRESSED-DOMAIN BIT RATE REDUCTION SYSTEM

CROSS-REFERENCE TO RELATED APPLICATIONS

Related subject matter is disclosed in the co-pending commonly assigned U.S. patent applications of: Yan et al., 08/332,984 filed Nov. 1, 1994 and Ser. No. 08/332,985 filed Nov. 1, 1994.

BACKGROUND OF THE INVENTION

1. Field of the Invention

The invention relates generally to multimedia communication systems which utilize endpoint devices, and more specifically to techniques for matching the video transmission rates of a plurality of endpoint devices.

2. Description of Prior Art

Video transmission rate matching is a technique which has been used to convert the bit rate of a first video bit stream to match that of a second video bit stream. This conversion may require bit rate reduction and/or bit rate increases. Among these two conversion processes, bit rate reduction is more critical, due to the fact that this process involves the removal of bits. Since these bits represent video information, the quality of a video signal having a reduced bit rate may be degraded. The amount of degradation is related to the manner in which the bit rate reduction is achieved.

With respect to bit rate increases, no information is removed from the video bit stream. Instead, such a rate increase requires the incorporation of additional bits into the bit stream. Although it would be desirable to add bits to the bit stream for the purpose of enhancing the video signal, such enhancements are often in the pel domain. For example, if an incoming video signal has been subjected to a process of data compression, the information discarded in the compression process is not stored. The information is lost, and cannot be recovered and added to the bit stream during the process of increasing the bit rate. Therefore, bit rate increases are implemented by adding "extra" bits to the bit stream, wherein these "extra" bits are not the same bits that may have been removed during a previous data compression step. Bits are added using conventional bit-stuffing patterns to occupy the additional bandwidth of a rate-increased video signal.

Video transmission rate matching has been applied to a wide variety of applications in the field of multimedia communication, especially in environments involving multipoint communication topologies. For example, in multimedia conferencing applications, a "bridge" or "multipoint control unit" (MCU) is typically employed. This MCU is a computer-controlled device which includes a multiplicity of communication ports. The ports may be selectively interconnected in a variety of ways to provide communication among a group of endpoint devices. MCUs are often used to establish multi-party conferences among a plurality of endpoint devices, and to establish multi-party conference calls. A state-of-the-art MCU is described in ITU Document H.243, "Procedures for Establishing Communication Between Three or More Audiovisual Terminals Using Digital Channels up to 2 Mbps". March 1993, and in ITU Document H.231, "Multipoint Control Units for Audiovisual systems Using Digital Channels up to 2 Mbps", March 1993.

Existing MCUs require all endpoint devices participating in a given multimedia conference to use the same video transmission rate. Typically, during the initial setting up of a multimedia conference, or at the time that it is desired to add an additional endpoint device to an existing conference, the MCU polls all of the endpoint devices to ascertain the video transmission rate or rates each endpoint device is equipped to implement. When the MCU polls a given endpoint device, the endpoint device transmits a capability code back to the MCU. The capability code includes information specifying the video bit rate transmission capabilities, audio bit rate transmission capabilities, etc., of a given endpoint device. These capability codes may also specify the compression algorithm or algorithms used by a given endpoint device.

Based upon the capability codes received by the MCU from the various endpoint devices, the MCU selects a minimum video bit rate to be used as the video transfer rate for the multimedia conference. The MCU sends a video rate signal to all endpoint devices which specifies use of this video transfer rate. Upon receipt of the video rate signal, the endpoint devices all operate using the same video transfer rate.

Use of the same video transfer rate for all endpoint devices participating in a given conference presents significant shortcomings. For example, in many cases, a conference participant may desire to receive high-quality video by using a relatively high video transfer rate, whereas other participants may want to use less expensive equipment offering a lower video transfer rate. State-of-the-art MCUs cannot implement a multimedia conference using a plurality of different video transfer rates. Therefore, it would be desirable to equip existing MCUs with a video transmission rate matching device. Through the use of video transmission rate matching techniques, video communication among a plurality of endpoint devices will be provided, even when the endpoint devices use different video transmission rates.

One video transmission rate matching method well-known to those skilled in the art is termed the transcoding method. Pursuant to the transcoding method, a compressed video bit stream having a first bit rate is fully decoded into a video space known as the pel domain. This fully-decoded bit stream, which may be conceptualized as a completely reconstructed video sequence, is then encoded into a video bit stream having a second bit rate.

The existing transcoding method is disadvantageous. Since decoding as well as encoding processes are required, transcoding is very time-consuming. As a practical matter, the time delay is at least twice that of the end-to-end encoding delay. Such a delay is not tolerable for applications requiring real-time communication, such as multimedia conferencing. A faster method of performing video bit rate matching is needed.

SUMMARY OF THE INVENTION

Improved bit rate reduction techniques are disclosed. When incorporated into an existing video processing system having a DCT coefficients processor, the motion vector processor disclosed herein provides enhanced computational and memory storage efficiencies over prior art designs. The motion vector processor includes a microprocessor and associated motion vector memory. The motion vector memory is adapted to store a plurality of motion vectors corresponding to at least one image frame containing a plurality of macro blocks. Each motion vector is represented by an X value and a Y value, the X value and the Y value signifying image changes within a given macro block from a given frame to the immediately preceding frame.

DETAILED DESCRIPTION

For illustrative purposes, video transmission rate matching will be described in the operational context of an H.261 environment. However, it is to be understood that the video transmission rate matching techniques described herein are generally applicable to any video compression algorithm which uses transformation and quantization processes. For example, the techniques disclosed herein may be employed in conjunction with video telephones of the type described in CCITT recommendation COST 211. However, for purposes of the present disclosure, video data to and/or from the video transmission rate matching system will be compressed in an H.261-like format.

An "H.261-like" format is any coding format which is similar to the coding format currently being established by the International Telecommunications Union (ITU-T). The format is described in the ITU-T document "Recommendation H.261, Video Codec for Audiovisual Services at px64 kbits/s", May 1992, and the ITU-T document "Description of Reference Model 8", Jun. 9, 1989.

Figure 1:
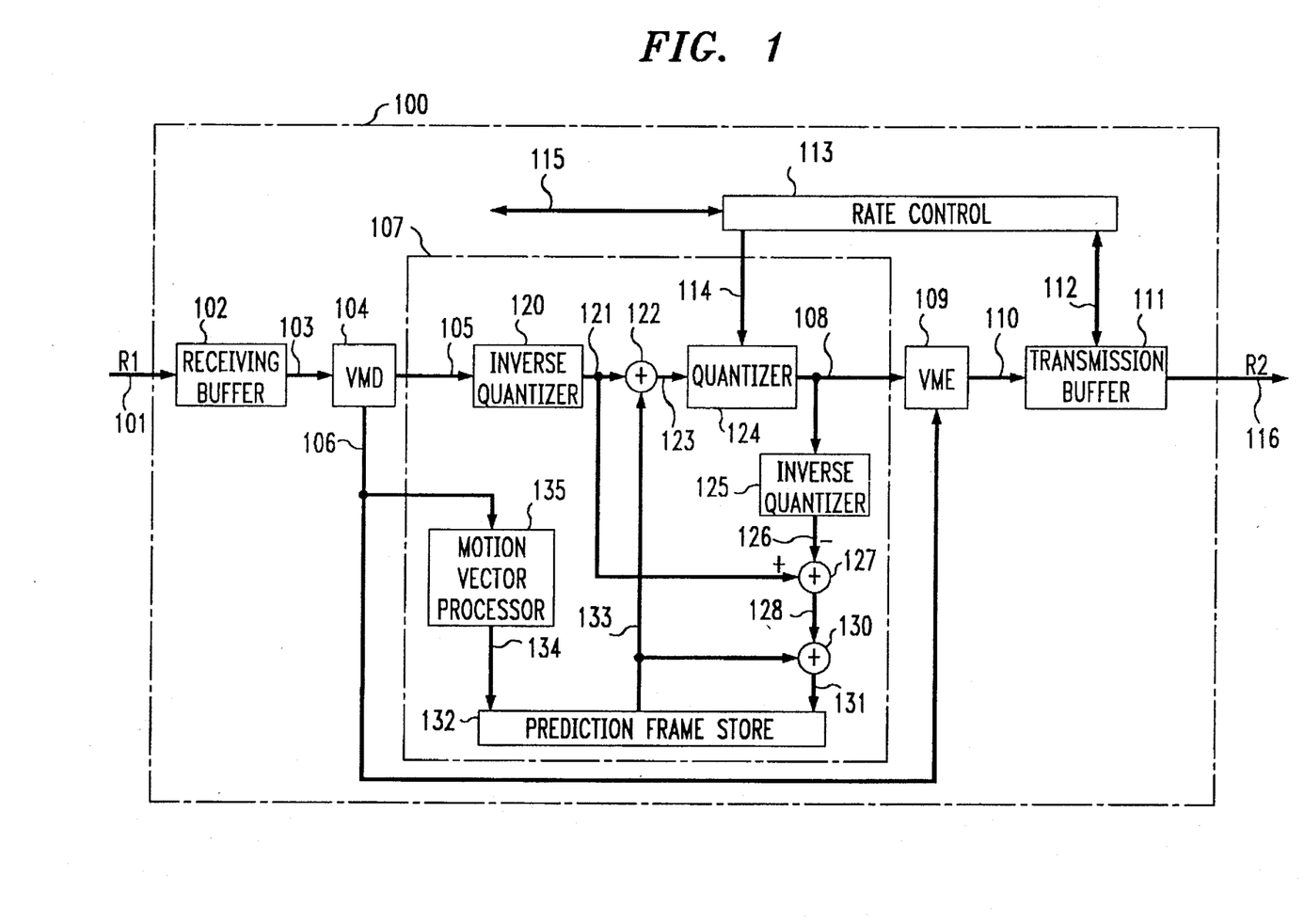
FIG. 1 is a hardware block diagram of a video transmission rate reduction apparatus according to a preferred embodiment disclosed herein.

FIG. 1 is a hardware block diagram showing a transmission rate reduction system 100 for a video signal which has been compressed in an H.261-like format. The transmission rate reduction system 100 includes an input port 101 for accepting a compressed video signal having a first bit transmission rate and an output port 116 for providing a compressed video signal having a second bit transmission rate. A compressed video signal is defined as the binary representation of a video signal which has been compressed by a coding algorithm substantially similar to that described in the H.261 standard, and then coded according to a syntax substantially similar to that described in the H.261 standard.

A compressed video signal in the form of a digital, coded bit stream is presented to input port 101. This compressed video signal includes coded digitized video information along with a header. The header may include the types of information specified in the H.261 standard, and/or other types of information such as the source, the destination, the content, and/or the organization of the video information.

Input port 101 is connected to a receiving buffer 102, which is a conventional digital buffer. This receiving buffer 102 provides electrical isolation between the source of the compressed video signal and the various circuit elements shown in FIG. 1.

The output of the receiving buffer 102 is coupled to a video multiplex decoder (VMD) 104. VMD 104 includes the combination of a decoder and a demultiplexer. The demultiplexer is equipped to demultiplex the coded bit stream. The decoder decodes header information which has been coded into the aforementioned coded bit stream. The demultiplexer and decoder perform the function of recovering compressed video data from the coded bit stream.

The VMD 104 includes a first output port 105 and a second output port 106. The VMD 104 provides the first output port 105 with quantized DCT coefficients along with quantization information. The nature of these DCT coefficients is described in greater detail in the H.261 standard. The second output port 106 is provided with motion vectors. First output port 105 is coupled to inverse quantifier 120, and second output port 106 is coupled to a video multiplex encoder (VME) 109 and motion vector processor 135. The operation and structure of VME 109 will be described in greater detail below. The motion vectors are sent directly from VMD 104 to VME 109 and motion vector processor 135 because no motion estimation is employed in the present example.

The DCT coefficients received from the first output 105 of VMD 104 are sent to DCT coefficients processor 107. The DCT coefficients processor 107 processes the DCT coefficients in such a manner that the output 108 of DCT processor 107 is a signal which requires fewer bits to encode than the number of bits which were received from the first output 105 of the VMD 104. The DCT coefficients processor 107 reduces the number of bits such that the resulting video quality is not substantially degraded as perceived by human visual processes. In other words, the video quality is degraded "gracefully". The amount of information reduced by processing coefficients at DCT coefficients processor 107 is controlled by the rate-control signal 114 sent by rate control unit 113. The most frequently used prior art technique is a requantization scheme which will be discussed in greater detail hereinafter.

The processed DCT coefficients are produced at the output 108 of DCT coefficients processor 107. These processed DCT coefficients, together with the motion vectors 106 produced at the second output of VMD 104, are sent to the video multiplexing encoder (VME) 109 to form a new video bit stream substantially conforming to the H.261 standard.

Figure 2:
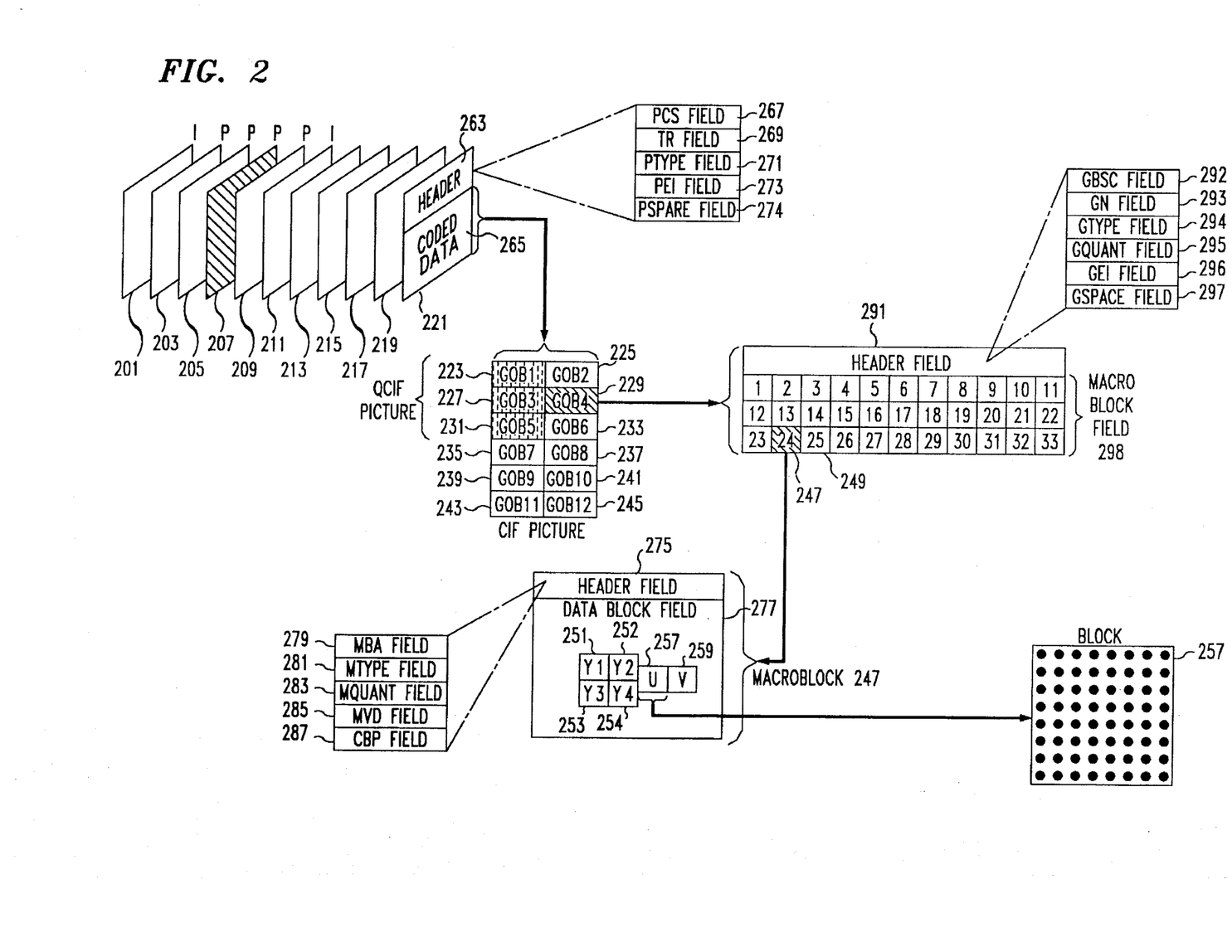
FIGS. 2 and 3 are data structure diagrams setting forth illustrative coding formats for representing video information.
Figure 3:
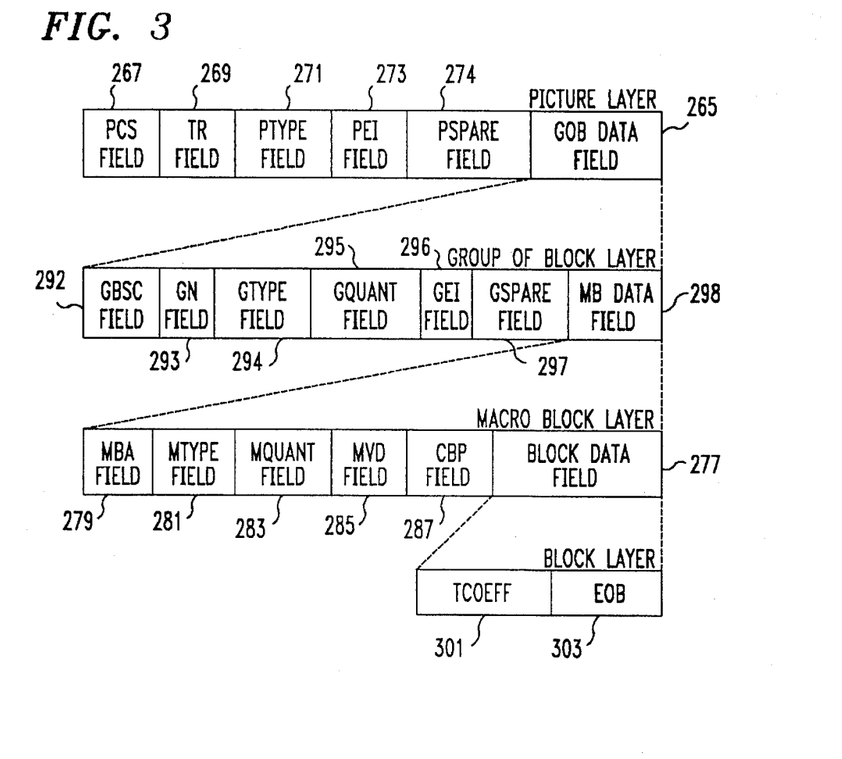

FIGS. 2 and 3 are data structure diagrams setting forth illustrative coding formats for representing video information in accordance with the H.261 standard.

Referring now to FIG. 2, video information consists of a plurality of frames 201, 203, 205, 207, 209, 211, 213, 215, 217, 219, 221. Each of these frames contains a a representation of a two-dimensional video image in the form of a pixel array. Since a given frame may represent a video image at a specific moment in time, a plurality of frames may be employed to represent a moving image. Each frame represents a picture. A plurality of frames represents a coded video sequence.

Each of the frames is compressed according to any one of two types of compression algorithms, termed intra-frame coding (I) and predictive coding (P). For example, frames 201 and 211 are compressed using intra-frame coding (I), and frames 203, 205, 207, 209, 213, 215, 217, 219, and 221 are compressed using predictive coding. The sequence of frames shown in FIG. 2 establish a data structure for representing a video image in the form of an encoded video sequence having a plurality of levels arranged in a two-dimensional array, wherein each level represents the value of a pixel element. This encoded video sequence may be termed a coded video bit stream.

If intra-frame coding (I) is to be applied to a given frame, such as frame 201, the frame is termed an I-designated frame, and if predictive coding (P) is to be applied to a given frame, such as frame 205, the frame is termed a P-designated frame.

Pursuant to intra-frame coding (I) compression processes, the I-designated frame 201 is divided into a plurality of pixel blocks, wherein each block consists of an array of 8×8 pixels. Next, a discrete cosine transform (hereinafter, DCT), is performed on each of the pixels in the 8×8 pixel block, in accordance with procedures well-known to those skilled in the art, to generate a plurality of DCT coefficients. Thereafter, quantization is performed on the DCT coefficients, in accordance with well-known quantization procedures. These quantized DCT coefficients constitute compressed video image information for the I-encoded frame 201.

Predictive coding (P) is implemented on a P-designated frame, such as frame 205, by: 1) partitioning the P-designated frame into a plurality of macro blocks. For example, if the frame includes a plurality of pixel arrays, each having 16×16 pixels (FIG. 2, 251, 252, 253, 254, 257, 258), each 16×16 pixel array may be partitioned into 4 contiguous blocks, wherein each block is an 8×8 pixel array; a 16×16 pixel array (luminance) together with an 8×8 pixel block (chrominance) and an 8×8 pixel block (chrominance), comprises a macro block 247; 2) for each of the macro blocks (16×16 pixels) created in step (1), searching the most recent previously occurring frame (which could be either a P- or an I-designated frame, but in the present example is frame 203) for the macro block which contains image information that is most similar to the image information in the macro block created in step (1); 3) generating motion vectors to spatially translate the macro block found in the prior I or P frame in step (2) to the location of the similar macro block in the P frame presently being compressed; 4) generating a predicted frame from the most recent previously occurring frame using the motion vectors; 5) on a macro-block-by-macro-block basis, subtracting the predicted frame from the P-frame being compressed, to generate blocks of residues; 6) performing DCT's on the blocks of residues; 7) quantizing the coefficients of the blocks of transformed residues: and 8) concatenating the quantized residue coefficients and the motion vectors to form a compressed video signal.

In an intra-frame coded (I) picture, every macro block is intra-coded. That is, each macro block is coded without referring to any macro block in the previous I- or P-frame. In the predictive-coded (P) picture, the macro block can be either intra-coded or inter-coded.

To form the coded video bit stream for transmission, the compressed image information as well as other information such as motion vectors, are coded using specified code words. The code words are then multiplexed into a layered data structure to form the final bit stream. In an H.261-like environment, the coded bit stream is organized into a hierarchical format, the structure of which is illustrated in FIG. 3.

Referring to FIG. 2, the sequence of flames 201, 203, 205, 207, 209, 211, 213, 215, 217, 219, 221 forms a coded video bit stream. This bit stream may be conceptualized as a serial representation of coded flames which can be processed to form a moving video image (i.e., a moving picture). A typical sequence of frames is IPPP . . . PIPPP, where I indicates an intra-coded frame, and P designates a predictive-coded frame. For each frame 221, the coded bit stream representing the frame includes a header 263 and coded data 265. Each header 263 includes a start code and data related to the respective frame (i.e., picture). In an H.261 system environment, much of the header information is required for synchronization purposes. For example, at the frame (picture) layer for frame 221, header 263 includes a picture staff code (PCS) field 267, a picture number (TR) field 269, a picture type (PTYPE) field 271, a PEI field 273, and a PSPARE field 274. The PEI field 273 and the PSPARE field 274 are adapted to accommodate extra information which may be required for future applications.

Picture data is segmented into Groups of Blocks (GOB) 223, 225, 227, 229, 231, 233, 235, 237, 239, 241, 243, and 245. A GOB (for example, GOB 229) comprises one-twelfth of the coded frame (CIF) 221. Therefore, GOB 229 may be conceptualized as including one-third of one quarter of a coded picture area. The area represented by one-quarter of a coded picture is abbreviated as QCIF. Accordingly, there are 12 GOBs 223, 225, 227, 229, 231, 233, 235, 237, 239, 241, 243, 245 in a CIF frame 221, and three GOBs in a QCIF frame. The arrangements of GOBs in a CIF/QCIF picture are depicted in FIGS. 2 and 3.

Each GOB 229 includes a header field 291, followed by a macro block data field 298. The header field 291 includes a GOB start code (GBSC) field 292, a group number (GN) field 293, a group type (GTYPE) field 294, a GOB quantizer (GQUANT) field 295, and spare information fields in the form of GEI field 296 and GSPARE field 297. Each GOB 229 consists of 33 macro blocks, such as "macro block 24" (reference numeral 247) and "macro block 25" (reference numeral 249). The arrangement of macro blocks within a GOB is depicted in FIG. 2.

Each macro block includes a header field 275 followed by a block data field 277. The header field 275 includes a macro block address (MBA) field 279, a block type information (MTYPE) field 281, a quantizer type (MQUANT) field 283, a motion vector (MVD) field 285, and a coded block pattern (CBP) field 287. The block data field 277 of each macro block 247 consists of 6 blocks, including four luminance blocks Y1 (reference numeral 251), Y2 (reference numeral 252), Y3 (reference numeral 253), Y4 (reference numeral 254), one chrominance block U (reference numeral 257), and one chrominance block V (reference numeral 259). An illustrative example of the contents of luminance block U (reference numeral 257) is set forth in FIG. 2. Note that this block includes an 8×8 pixel array wherein all pixels have a luminance value of black.

Figure 4:
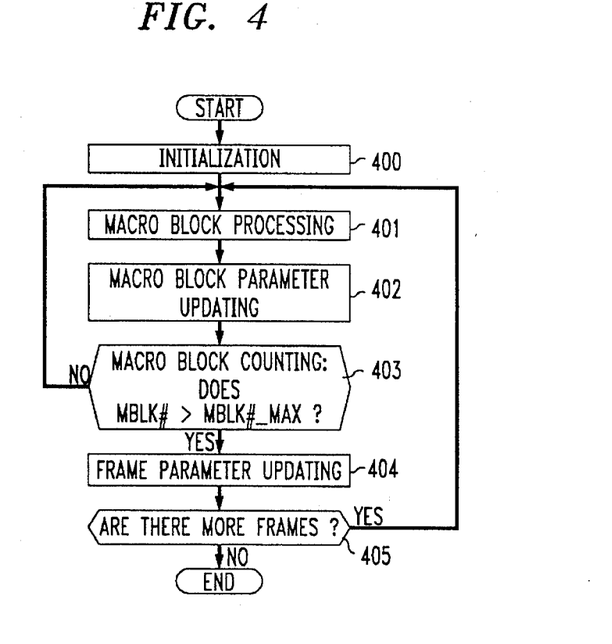
FIG. 4 is a software flowchart setting forth a procedure for performing video bit rate matching according to a preferred embodiment disclosed herein.

A block represents a matrix (array) of pixels, e.g., 8×8, over which a discrete cosine transform (DCT) is performed. The array of pixels is represented by a matrix of pixel array coefficients, including a DC coefficient and a plurality of AC coefficients. The transformed coefficients (TCOEFF) 301 (FIG. 3) consists of a DCT DC coefficient occurring first, followed by respective pixel array coefficients (AC), in the order of their relative importance. The arrangement of DC and AC coefficients in an illustrative block data field 277 (FIG. 3) is shown in FIG. 4. The block data field 277 (FIG. 3) consists of the transformed coefficients (TCOEFF) 301 and an end of block code (EOB) 303 which are appended at the end of each successively occurring block of data. The VME 109 encodes the processed DCT coefficients and motion vectors, and multiplexes them into the layered data structures shown in FIG. 3, to be described in greater detail hereinafter. The new coded bit stream, produced at the output 110 of VME 109, is sent to a transmission buffer 111.

As it is well-known that compressed video data signals may include a plurality of components, wherein each component may be represented by a different number of bits, transmission buffer 111 performs a variable-rate to constant-rate translation for the compressed video. The transmission buffer 111 includes circuitry to ascertain and to indicate the status of the transmission buffer 111, which is defined as the occupancy ratio of the memory locations within the transmission buffer 111. The occupancy ratio refers to the ratio between the number of occupied memory locations within a given buffer and the total number of memory locations within this buffer. The buffer status is produced at a first input/output 112 of the transmission butter 111. This first output 112 is coupled to a rate control 113 circuit. This rate control 113 circuit adjusts the average data rate provided by the DCT coefficients processor 107.

Figure 5:
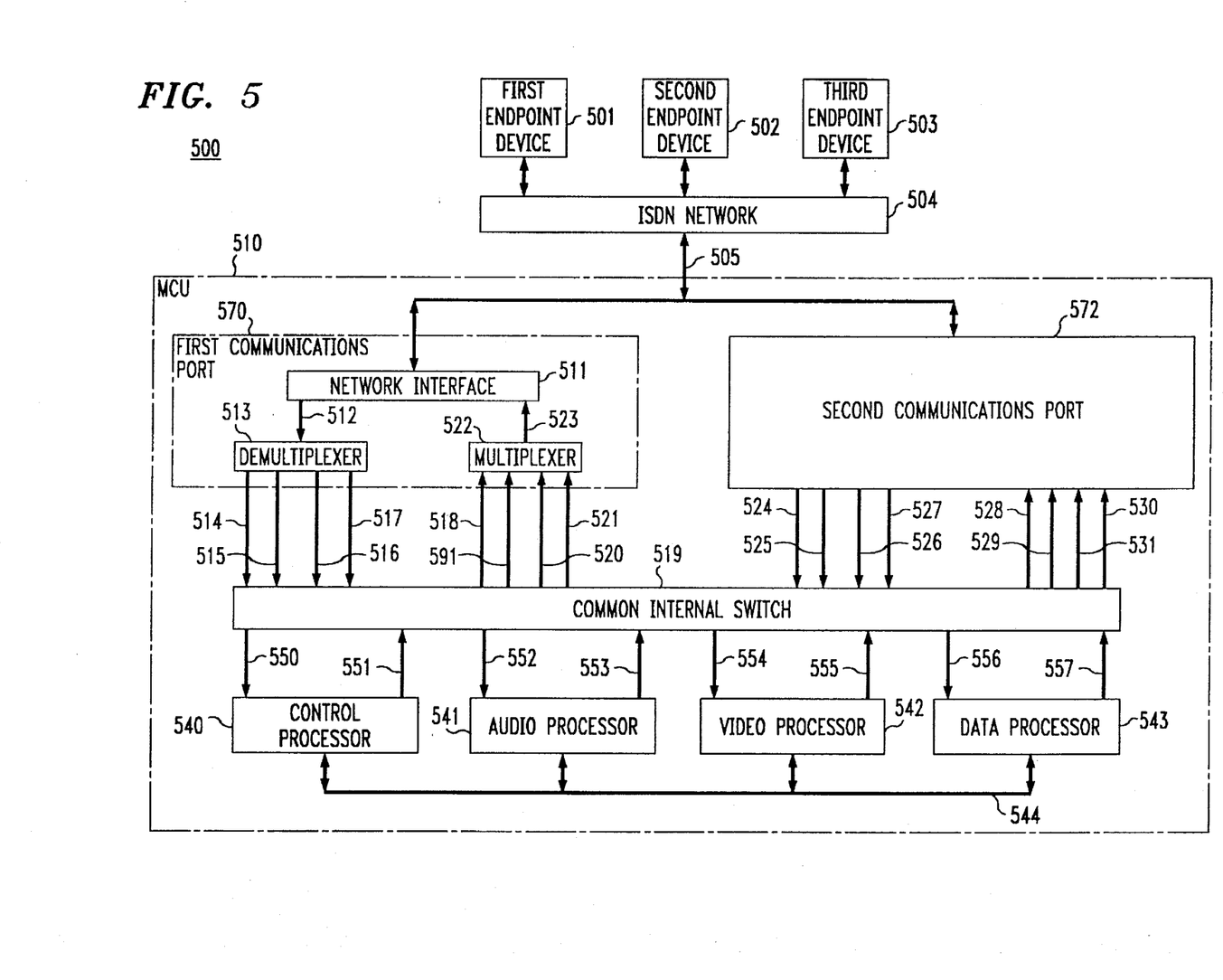
FIG. 5 is a hardware block diagram setting forth the system architecture of a multimedia conferencing system which includes an MCU having a video processor equipped to perform video transmission rate matching methods according to various preferred embodiments disclosed herein.

Rate control 113 circuit and DCT coefficients processor 107 are coupled together via signal line 114. The rate control 113 circuit includes a first communications line 115 adapted for receiving a signal, (for example, from a control processor) which specifies a desired output bit rate for transmission buffer 111. The communications line 115 is also adapted to transmit signals to control processor 540 (FIG. 5). The desired output rate signal is processed by rate control circuit 113 in conjunction with the buffer status signal received at the first input/output 112, to generate a rate control output signal which is downloaded via signal line 114 to DCT coefficients processor 107. Based upon the desired output rate signal and the buffer status signal, the rate control 113 circuitry computes the total number of bits for each frame, as well as the bits targeted for each macro block. The targeted bits per macro block or bits per frame are used as reference to produce a proper control signal, which is applied to a second input 114 of the DCT coefficients processor 107. The function of the second input 114 is to force the DCT coefficients processor 107 to operate in such a manner that the bits produced for each macro block are as close to the targeted bits per macro block as possible. The type of signal applied to second input 114 is dependent upon the specific type of DCT coefficients processor 107 which is utilized.

DCT coefficients processor 107 is the processing unit where the DCT coefficients recovered from the VMD 104 are further processed in order to match a desired (i.e., target) output video rate. The DCT coefficients processor 107 consists of inverse quantizer 120, quantizer 124, another inverse quantizer 125, summers 122, 127, 130, prediction frame store 132 and motion vector processor 135. The output signal at the first output 105 of VMD 104 includes two components: quantized DCT coefficients, and a quantization parameter. These two components are sent to inverse quantizer 120. At 120, an inverse quantization operation is performed on the quantized DCT coefficients as follows. Let $\{x_i, i=0, 1, 2, \ldots 63\}$ be the quantized DCT coefficients and $\{y_i, i0, 1, \ldots 63\}$ be the reconstructed DCT coefficients, with Qp representing the quantization parameter. Then, with respect to an H.261-like environment, in the I-coding mode, the reconstructed DC coefficient $y_0$ is calculated using the relationship $$y_0 = x_0 * 8,$$

and the remaining coefficients are calculated using the formula $$y_i = [x_i * 2 + \sin(x_i)] * Qp.$$

where $\{i=1, 2, \ldots 63\}$ in I mode, and the $\{i=0, 1, \ldots 63\}$ in P mode, and the sign(w) function is defined as follows:

$$\text{sign}(w) = \begin{cases} 1 & \text{if } w \geq 0 \\ -1 & \text{if } w < 0 \end{cases}$$

$\{y_i, i=0, 1, 2, \ldots 63\}$ are the output of 120, which are represented by signal 121. At summer 112, the reconstructed signal 121 plus signal 133 are sent to the quantizer 124. To control the amount of data produced by the DCT coefficients processor 107 (FIG. 1) at 108, the rate-control unit computes the proper quantization parameter $Qp_{new}$ based on the targeted bits per macro block and sends it to the DCT coefficients processor 107, more specifically, the quantizer 124, to requantize the DCT coefficients. Let $\{z_i, i=0, 1, \ldots 63\}$ be the new quantized DCT coefficients, which are represented by signal 108. Let $Qp_{new}$ be the new quantization parameter obtained from the rate control 113 circuit. Then, the new quantized DCT coefficients are determined by $$z_0 = (y_0 + 4)/8,$$

where $z_0$ is the DC coefficient of the I-coded macro block. The rest of the coefficients are obtained by $$z_i = y_i(2 * Qp_{new})$$

where $\{i=1, \ldots 63\}$ for the intra-coded macro block, and $\{i=0, 1, \ldots, 63\}$ for inter-coded macro blocks.

Signal 133 is the feedback signal or compensation signal. The use of the signal is to compensate for the mismatch caused by the above requantization process. It is well-known that processes implemented in the DCT domain reduce the information content and this reduction often causes mismatch error, or drift error, between an endpoint device that transmits video information at a fast rate relative to other endpoint devices which decode this video information at a slower rate. This "drift error" will be seen at the output transmission buffer and at the endpoint which decodes the rate-reduced bitstream. This mismatch exists for all the inter-coded frames and is likely to accumulate with time unless an intra-coded frame is employed to refresh the memory and to discard the errors accumulated in memory. The "drift error" introduces additional noise and artifacts into the rate-reduced bitstreams which degrades the picture at the decoder side. To correct the "drift error", a feedback loop is introduced in the requantization loop. To generate the feedback signal, the requantizated DCT coefficients 108 are sent to another inverse quantizer 125. At inverse quantizer 125, the signal 108 is reconstructed to form signal 126. Signal 126 represents the reconstructed DCT coefficients based on the new quantization parameter Qpnew. The drift error is represented as signal 128 which is obtained by subtracting signal 126 from signal 121 at the summer 127. As all the operations are done at the DCT domain, the signal 128 is actually the DCT coefficients of the drift error. Note that when the DCT coefficient processor is initially started up, there is no drift error between output of 120 and 125. Signal 126 is zero. Therefore, upon initial startup, inverse quantizer 125 provides an output signal including reconstructed DCT coefficients, and this signal passes unchanged through the first summer 122 to the quantizer 124. Meanwhile, the signal 126 produced by the current frame passes unchanged through the third summer 130 to the prediction frame storage unit 132. Typically, if the current frame is an I-frame (Intra-frame), the signal 128 passes the summer 130 unchanged to the prediction frame store 132. If the current frame is inter-frame, (P-frame), the signal 128 is added by signal 133 to form signal 131, which is sent to the prediction frame store 132. Note that signal 131 is obtained by adding the one-frame-delayed version of signal 133 to signal 128.

Prediction frame store 132 receives the signal 131 and the processed motion vector 134 and produces the DCT representation of the displaced (or motion-compensated) drift error 133. This signal is fed back to the requantization loop at summer 122 to compensate for mismatch in the requantization loop. As the drift error signals are represented by their DCT representation, the motion compensation and prediction are done directly in the DCT domain.

Figure 8:
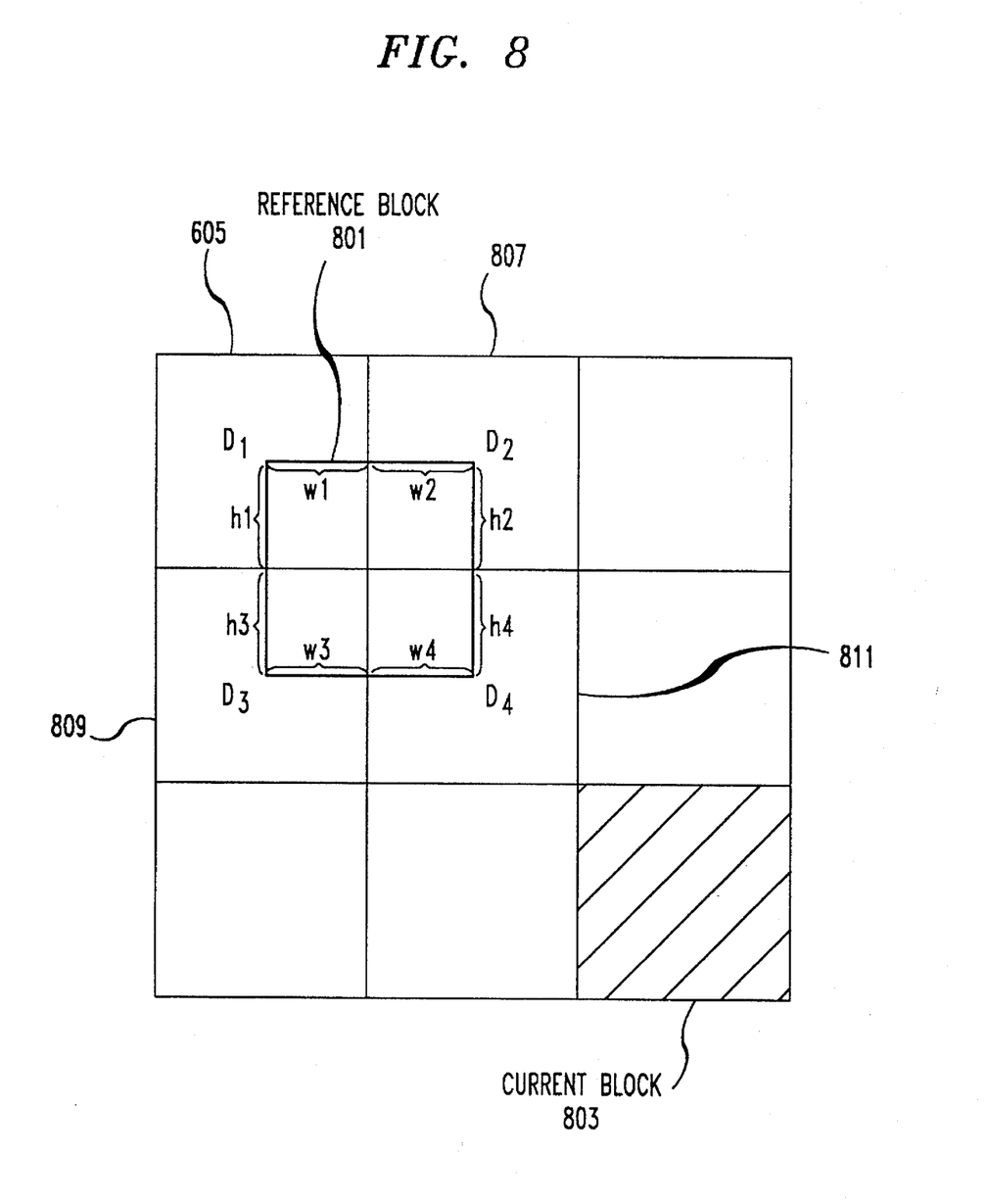
FIG. 8 is a graphical representation of a reference block in the DCT domain.

To compute the displaced drift error directly in the DCT domain, the following operations are performed at prediction frame store 132. With reference to FIG. 8, since the motion vectors represent an arbitrary number of pels, and the DCT representation of the reference frame stored in the prediction frame store 132 are grouped into a block-based format, the motion compensated optimal reference block 801 may overlap with four neighboring blocks 805, 807, 809, 811 in the DCT block structure. FIG. 8 also shows the location of the current block 803. To compute the DCT coefficients of a new arbitrary-position image block directly from the DCT coefficients of four original neighboring blocks, the following operations are performed. Let $D_1$, $D_2$, $D_3$, and $D_4$ be the four neighboring blocks in the reference frame, $h_1$ and $w_1$, are the overlap height and width, respectively in $D_1$ (within block 805); $h_2$ and $w_2$ are the overlap height and width, respectively in $D_2$ (within block 807); $h_3$ and $w_3$, are the overlap height and width, respectively in $D_3$ (block 809); and $h_4$ and $w_4$, are the overlap height and width, respectively in $D_4$ (block 811). Let $D_{mc\text{-}error}$ be the DCT representation of the displaced drift error block. Then $$D_{mc\text{-}error} = \sum_{k}^{4} G_{hk} D_k G_{wk}$$

where $G_{hk}$ and $G_{wk}$ are the DCT representations of the special sparse matrices of the form:

$$H_{hk} = \begin{bmatrix} 0 & 0 \\ I_{hk} & 0 \end{bmatrix},$$

$$H_{wk} = \begin{bmatrix} 0 & I_{wk} \\ 0 & 0 \end{bmatrix}$$

and $$G_{hk} = DCT(H_{hk})$$
$$G_{wk} = DCT(H_{wk})$$

For example, if $h_1=h_2=2$, $h_3=h_4=6$, $w_1=w_3=3$, and $w_2=w_4=5$, then $$H_{h1} = H_{h2} = \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 1 & 0 & 0 & 0 & 0 & 0 & 0 & 0 \\ 0 & 1 & 0 & 0 & 0 & 0 & 0 & 0 \end{bmatrix}$$

$$H_{h3} = H_{h4} = \begin{bmatrix} 0 & 0 & 0 & 0 & 0 & 0 & 0 & 0 \\ 0 & 0 & 0 & 0 & 0 & 0 & 0 & 0 \\ 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \end{bmatrix}$$

$$H_{w1} = H_{w3} = \begin{bmatrix} 0 & I_3 \\ 0 & 0 \end{bmatrix}$$

$$= \begin{bmatrix} 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

$$H_{w2} = H_{w4} = \begin{bmatrix} 0 & I_5 \\ 0 & 0 \end{bmatrix}$$

$$= \begin{bmatrix} 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

The $G_{hk}$ and $G_{wk}$ can be precomputed and stored in the prediction frame storage unit. As the drift error signal contains a lot of zeros, the required computation is greatly reduced. Further, if motion vectors are zero, or integer multiples of the block width, the above block adjustment procedure can be avoided.

Motion vector processor 135 is the unit where the motion vectors obtained from VMD 104 are further processed. At motion vector processor 135, the motion vector, represented by signal 106 is processed according to the following rules:

Let MV__x and MV__y be the x and y components of the signal 106. Then MV__x and MV__y are in the range of −15 to 15, pursuant to the H.261 standard. The motion vector processing procedure rounds the motion vector to the nearest multiple of 8. Let MV__x' and MV__y' be the processed motion vector. Then MV__x' and MV__y' are obtained by:

if −4<=MV__x or MV__y<=4, MV__x' or MV__y'=0;

if 5<=Mv__x or M__y<=12, MV__x' or MV__y'=8;

if 13<=MV__x or MV__y<=15, MV__x' or MV__y'=16;

if −12<=MV__x or MV__y<=−5, MV__x' or MV__y'=−8;

if −15<=MV__x or MV__y<=−13, MV__x' or MV__y'=−16.

By rounding the motion vectors to integer multiples of the block width, the block adjustment procedure in the DCT domain is avoided. The computation and the amount of required frame storage in the prediction frame store 132 are greatly reduced.

Inverse quantizer 120, 125, quantizer 124, summers 122, 130, and subtractor 127 are system components which are well-known to those skilled in the art. Conventional components may be used for these items. With respect to the prediction frame store 132, this device includes a video buffer for storing information corresponding to one or more video frames, a random-access memory device, and a microprocessor for controlling the operation of the buffer and the random-access memory. The microprocessor is equipped to execute a software program adapted to perform the steps outlined above in connection with the prediction frame store 132.

FIG. 4 is a software flowchart setting forth a procedure for performing video bit rate matching according to a preferred embodiment disclosed herein. The operations set forth in the flowchart may be implemented using the hardware previously described in connection with FIG. 1, wherein the functioning of rate control 113 circuit was disclosed. As shown in FIG. 4, the video bit rate matching procedure consists of six steps. The first step is initialization 400, followed by macro block processing 401, macro block parameter updating 402, and macro block counting 403. At block 403, a test is performed to ascertain whether or not the number of macro blocks that have already been processed are greater than a maximum number of macro blocks. If not, the program loops back to block 401. If so, the program progresses to block 404, where frame parameters are updated. Next, at block 405, frames are counted, and a test is performed to ascertain whether or not there are additional frames to consider. If so, the program loops back to block 401. If not, the program ends.

Referring to block 400, in the initialization stage, the rate control unit 113 (FIG. 1) performs the following series of operations:

1. Obtaining the new (desired and/or target) video output bit rate;
2. According to the new video output bit rate, specifying the maximum output frame rate;
3. Sending the maximum frame rate via communications line 115 to the sender endpoint device (defined above) to force this endpoint to encode the video with the maximum frame rate.
4. Computing the average number of bits per frame as average_bits_per frame. Let new video bit rate be $R_{out}$ and the maximum frame rate be $F_{out}$, then the $$\text{average\_bits\_per\_frame} = \frac{R_{out}}{F_{out}}.$$

5. Initializing the transmission buffer with an initial buffer memory occupancy rate (fullness) of $B_0$.
6. Specifying the targeted_bits_per_frame for the 1st frame.

$$\text{targeted\_bits\_per\_frame} = K * \frac{R_{out}}{F_{out}}$$

where K is a constant which is chosen based on the maximum frame rate and the initial buffer fullness $B_0$. Then the targeted_bits_per_mblk is $$\text{targeted\_bits\_per\_mblk} = \frac{\text{targeted\_bits\_per\_frame}}{\text{total\_number\_of\_mblk}}$$

7. According to the targeted_bits_per_mblk, specify the new quantization parameter $Qp_{new}$.

At the macro block processing step (block 401), the DCT coefficients processor 107 performs the following steps:

1. Obtaining an mblk from the VMD 104;
2. Performing inverse quantization based on the Qp and recovering the DCT coefficients;
3. Get the feedback signal 133 and add the feedback signal to the recovered DCT coefficients.
4. Obtaining the control signal on signal line 114 from rate control 113 circuit;
5. Using the control signal on signal line 114, requantizing the DCT coefficients.
6. Performing inverse quantization based on the signal or signal line 114 and compute the displaced drill error of the current frame, and store them in the prediction frame store 132.

After the processing of one macro block has been completed, the rate control 113 circuit 113 obtains the new (current) transmission buffer 111 status and updates the control signal on signal line 114. The steps implemented by rate control 113 circuit include:

1. Obtaining the total number of bits used for the macro block, bits_per_mblk:
2. Computing the difference between the targeted_bits_per_mblk and the actual bits_per_mblk:

bits_difference+=targeted_bits_per_mblk-bits_per_mblk.

3. Updating the control signal 114 based on the following:

If difference>0, reduce the size of the quantization parameter; else if difference<0, increase the size of the quantization parameter; else no change.

At the end of processing each macro block, a macro block counter which counts the number of macro blocks which have been processed, is checked against the total number of macro blocks to ascertain whether or not a frame has been completed. If a frame has been completed, rate control 113 circuit commences updating the frame parameters. At block 404, the rate control 113 circuit performs the following steps:

1. Obtaining the transmission buffer 111 status;
2. Obtaining the total bits used by the frame;
3. Based upon the targeted buffer fullness (memory location occupancy rate), computing the targeted bits for the next frame and the targeted bits for each macro block;
4. Based on the targeted bits for each macro block, generating an appropriate control signal for the first macro block of the next frame.

After frame parameter updating, the new frame is checked. If there are no more bits, then the procedure ends. Otherwise, the procedure reverts back to the macro block processing step at block 401.

The video transmission rate reduction system shown in FIG. 1 can be implemented, for example, by using a general-purpose microprocessor, a digital signal processor (such as an AT&T DSP 3210 or an AT&T DSP 1610), and/or a programmable video processing chip (such as an integrated circuit known to those skilled in the art as the ITT VCP chip).

Multimedia System Using Video Processing of the Present Invention

To illustrate various typical applications for the present invention in the context of multimedia conferencing, FIG. 5 shows a multimedia system using a video processor embodying the bit stream rate matching techniques disclosed herein. Referring now to FIG. 5, a block diagram setting forth the system architecture of a multimedia conferencing system 500 is shown. The conferencing system includes an MCU 510, an ISDN network 504, and a plurality of endpoint devices such as first endpoint device 501, second endpoint device 502, and third endpoint device 503.

Endpoint devices 501, 502, and 503 are coupled to MCU 510 via ISDN network 504. These endpoint devices 501, 502, and 503 may include one or more user interface devices. Each interface device includes either an input means, an output means, or an input means combined with an output means. Output means are adapted to convert multimedia electronic signals representing audio, video, or data into actual audio, video, or data. Input means are adapted to accept audio, video, and/or data inputs, and to convert these inputs into electronic signals representing audio, video, and/or data. Examples of user interface devices include video display, keyboards, microphones, speakers, and video cameras, or the like.

Endpoint devices 501, 502, and 503 are adapted to communicate using existing multimedia communication protocols such as ISDN. The endpoint device multimedia communication protocol controls the presentation of media streams (electronic signals representing audio, video, and/or data information) to the endpoint device user. Endpoint devices may function bi-directionally, both sending and receiving multimedia information, or, alternatively, endpoint devices may function uni-directional, receiving but not sending multimedia information, or sending but not receiving multimedia information.

An example of a suitable endpoint device is an ITU-T H.320 audiovisual terminal, but any device capable of terminating a digital multimedia stream and presenting it to the user constitutes an endpoint device. A particular product example of an H.320-compatible endpoint is the AT&T-GIS Vistium.

MCU 510 is a computer-controlled device which includes a multiplicity of communications ports, such as first communications port 570 and second communications port 572, which may be selectively interconnected in a variety of ways to provide communication among a group of endpoint devices 501, 502, 503. Although the system of FIG. 5 shows two communications ports, this is done for illustrative purposes, as any convenient number of communications ports may be employed. MCU 510 also includes a control processor 540, an audio processor 541, a video processor 542, a data processor 543, and a common internal switch 519. Each communications port includes a network interface, a demultiplexer, and a multiplexer. For example, first communications port 570 includes network interface 511, demultiplexer 513, and multiplexer 522.

Although MCU 510 is shown with two communications ports 570, 572 for purposes of illustration, MCU 510 may, in fact, include any convenient number of communications ports. For an MCU 510 having N ports, there are N network interfaces, one control processor, one audio processor, one video processor, and one data processor. For each processor, there are N input signals coming from N demultiplexers and N output signals going to the N multiplexers. Therefore, MCU 510 may be conceptualized as an N-port MCU where only two communications ports 570, 572 are explicitly shown.

As shown in FIG. 5, first communications port 570 includes network interface 511, demultiplexer 513, and multiplexer 512. Network interface 511 is a circuit which provides the conversion function between the standard line signal coding used by ISDN network 504 and the P×64 kbps H.221 signal used by MCU 510. Network interface 511 includes output port 512, which is adapted to provide an output in the form of an H.221 signal. The H.221 signal is actually a multiplex of several different types of information (audio, video, data, control); therefore, network interface 511 must send the incoming MCU H.221 signal to a demultiplexing device such as demultiplexer 513. Likewise, network interface 511 has an input port 523 adapted to receive an H.221 signal from multiplexer 522. Multiplexer 522 combines a plurality of individually-processed signals which are to be transmitted to a particular endpoint device.

Demultiplexer 513 separates an incoming multimedia signal stream received from network interface 511 into four components: a first component 514, comprising electronic signals representing control; a second component 515, comprising electronic signals representing audio; a third component 516, comprising electronic signals representing video; and a fourth component 517, representing data. The first, second, third, and fourth components 514, 515, 516, 517 represent outputs of demultiplexer 513 which are coupled to common internal switch 519.

Multiplexer 522 accepts a plurality of incoming multimedia signal components from common internal switch 519, such as a first component 518 representing control, a second component 591 representing audio, a third component 520 representing video, and a fourth component 521 representing data. The multiplexer 522 integrates the first, second, third, and fourth components 518, 591, 520, 521 onto a single multimedia signal stream which is coupled to network interface 511. This single multimedia signal stream may be conceptualized as the output of multiplexer 522. The network interface 511 routes this multimedia signal stream to a specific endpoint device 501, 502, 503. For second communications port 572, the four output components are first component 524, representing control, second component 525, representing audio, third component 526, representing video, and fourth component 527, representing data. The four input components are first component 528, representing control, second component 529, representing audio, third component 530, representing video, and fourth component 531, representing data.

Common internal switch 519 contains a plurality of electronic switches, buffers, and/or amplifiers under the control of control processor 540. Common internal switch 519 is coupled to audio processor 541 for mixing and switching electronic signals representing audio; common internal switch 519 is also coupled to video processor 542 and data processor 543 for mixing and switching electronic signals representing video and data, respectively. Therefore, common internal switch 519 effectively receives four output components from each communications port 570, 572 and routes these output components to selected ones of respective processors (control processor 540, audio processor 541, video processor 542, and/or data processor 543) within MCU 510. Likewise, common internal switch 519 receives the output components of each processor in MCU 510 and routes these outputs to respective multiplexers (i.e. 522) of each communications port (i.e. 570).

Common internal switch 519 receives output control signals from control processor 540 over signal line 551, and provides input control signals to control processor 540 over signal line 550. Common internal switch 519 receives output audio signals from audio processor 541 over signal line 553, and provides input audio signals to audio processor 541 over signal line 552. Common internal switch 519 receives output video signals from video processor 542 over signal line 555, and provides input video signals to video processor 542 over signal line 554. Common internal switch 519 receives output data signals from data processor 543 over signal line 557, and provides input data signals to data processor 543 over signal line 556. Control processor 540 provides control signals to the audio processor 541, video processor 542, and data processor 543 over signal line 544.

ISDN network 504 is connected to MCU 510 over signal line 505. Within MCU 510, signal line 505 is parallelconnected to first and second communications ports 570, 572. For example, in the case of first communications port 570, signal line 505 is connected to network interface 511. Network interface 511 is coupled to demultiplexer 513 over signal line 512, and this network interface 511 is also coupled to multiplexer 522 over signal line 523. Signal line 512 is coupled to the input terminal of demultiplexer 513, and signal line 523 is coupled to the output terminal of multiplexer 522.

Audio processor 541 includes software and hardware for processing audio signals. The processing may take the form of switching the audio, mixing the audio, or both. In the case of audio mixing, the input signal to audio processor 541 is an aggregate audio signal consisting of each of the audio output signals from all of the communications ports 570, 572 of MCU 510. For an N-port MCU 510, this signal includes the N audio signals from the demultiplexers within each communications port 570, 572.

To mix the audio, audio processor 541 decodes each of the audio inputs, linearly adds the signals obtained by decoding, and then re-encodes the linear sum. For each endpoint device, this linear sum may be subjected to additional processing steps, so as to provide each endpoint device with audio information specific to that endpoint device. These additional processing steps may include, for example, any of the following: the output sum for a given endpoint device may exclude that endpoint's input; the sum may include inputs whose present or recent past values exceed a certain threshold; or the sum may be controlled from a specially-designated endpoint device used by a person termed the "chair", thereby providing a feature generally known as chair-control. Therefore, the output of the audio processor 541 is in the form of N processed audio signals.

In the case of audio switching, the input signal to audio processor 541 is a single audio signal which is selected from a given communications port 570 or 572, based upon control signals received from control processor 540. No audio processing is implemented in the present example which involves only audio switching. The audio input is broadcast to all other audio processor 541 outputs, either automatically or under manual control.

Data processor 543 includes hardware and software means for implementing one or both of the functions generally known to those skilled in the art as "broadcast" or "MLP". For each type of broadcast data, data input is accepted from only one endpoint device at any one time. Therefore, the input signal to data processor 543 is the data output from one of the communications ports 570, 572. This data output is broadcast to the other endpoint devices as determined by control processor 540, according to the capabilities of specific endpoint devices to receive such data, as set forth in the capability codes stored in memory units (RAM or ROM) of respective endpoint devices.

Control processor 540 is responsible for determining the correct routing, mixing, switching, format and timing of the audio, video, data and control signals throughout a multimedia conference. The control processor 540 retrieves one or more capability codes from each endpoint device. Capability codes, which, are stored in endpoint device RAM and/or ROM, specify the audio, video, data, and/or control capabilities for this endpoint device. Control processor 540 retrieves the capability codes from all N endpoint devices participating in a multimedia conference. These capability codes are stored in a memory unit (RAM) of MCU 510 so that control processor 540 can correctly manage the conference for all endpoint devices. This storage may occur, for example, in a random-access memory (RAM) device associated with control processor 540. In turn, MCU 510 sends the capability codes to each of the N communications ports 570, 572 so that each of the endpoint devices 501, 502, 503 are enabled to communicate with MCU 510 at a bit rate determined by MCU 510 and appropriate for that specific endpoint device 501, 502, 503. To properly control the operations in the video processing unit 542, MCU 510 sends back different capability codes for different video operations. If the endpoints are coupled to MCU 510 via communications links with different transmission rates for switching operation, the minimum transfer rate is adapted in the capability code. The new code is sent to all the endpoint devices participating in the conference to force the endpoint devices to operate with the minimum transfer rate. For performing a transmission rate matching operation, instead of adapting the minimum transfer rate, a new maximum frame rate is specified in the capability code based on all the different transfer rates. The new capability codes, which include the specified maximum frame rates, are sent back to all the endpoint devices. In this case, the video bitstreams generated by the endpoint devices will have different transfer rates but the same frame rate.

Control processor 540 receives inputs which are entered by conference participants into the user interface of an endpoint device 501, 502, 503. These inputs are in the form of chair-control commands and commands embedded in bit streams conforming to the H.221 standard. Commands from endpoint devices are routed to the control processor 540 to ensure the correct distribution of bit streams to the audio, video, and data processors 541, 542, 543, respectively, to ensure that the correct audio decoding algorithm is used at the inputs to an audio mixer within audio processor 541, and to ensure that any incoming data is sent to a data broadcast unit or MLP processor within data processor 543.

The control processor 540 also directs the switching of the bit streams from the audio, video, and data processors 541, 542, 543, respectively, to each multiplexer (i.e., 522), and specifies the audio encoding algorithm used in the audio mixer of audio processor 541, and the algorithm used at each output from the audio mixer. The bit streams are routed to and from the various processors 541, 542, 543 by the common internal switch 519, which is under control of the control processor 540.

Video processor 542 processes the video signals received from the common internal switch 519. The processing may take the form of switching the video, or matching the video bit rate. In video switching, the video processor 542 receives one selected video signal from the switch 519, and transmits the video signal to some or all other endpoint devices participating in a given multimedia conference. Video selection may be automatic or under manual control. For instance, the audio processor 541 and the video processor 542 may be automatically controlled by control processor 540, such that an endpoint device with currently active audio (i.e., an endpoint device used by the "present speaker" which provides an audio signal to MCU 510 above a predetermined audio amplitude threshold) receives the picture of the endpoint device which previously had active audio (i.e., an endpoint device used by the "previous speaker"), while all other endpoint devices receive the picture of the present speaker.

A time delay may be incorporated into the video switching implemented by video processor 542 to avoid excessively frequent video image changes caused by spurious sounds. As in the case of audio switching, video switching may be controlled directly from a specially-designated endpoint device used by a person termed the "chair". If the delay in the video processor 542 and the delay in the audio processor 541 differ by a significant (humanly perceptible) amount, a compensating delay may be inserted into the appropriate bit stream to retain lip synchronization.

To match video bit rates, video processor 542 incorporates the video transmission rate matching techniques of the present invention.

Figure 6:
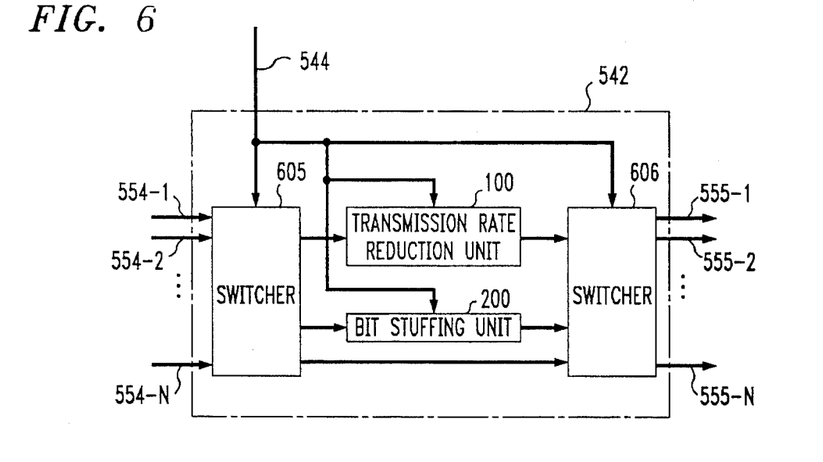
FIG. 6 is a block diagram showing an illustrative hardware configuration for the video processor of FIG. 5.

With reference to FIG. 6, the hardware configuration of an illustrative stand-alone video processor 542 is shown. This video processor 542 may be employed with the MCU 510 of FIG. 5 or, alternatively, the video processor 542 may exist as a stand-alone unit. Such a stand-alone unit may be used to match bit rates for all types of digital video information. The video processor 542 consists of a video transmission rate reduction unit 100, a bit stuffing unit 200, an input switcher 605, and an output switcher 606. If desired, the input switcher 605 and the output switcher 606 could be combined into a single integrated switcher unit, such as common internal switch 519 (FIG. 5) and, hence, would not be incorporated into video processor 542. The inputs to the video processor 542, are for an N-port MCU, an the N-coded video bit stream obtained from N demultiplexers. The outputs of the system are the N-coded video bit streams which are processed to have different transfer rates. The outputs are the inputs to the N multiplexers. The number of required transmission rate reduction units and bit stuffing units is proportional to the difference in the transmission rates among the various endpoint devices. If there are M different video transfer rates involved in a conference, the video processor 542 needs to incorporate (M-1) bit rate reduction systems and (M-1) bit rate increasing units. In the configuration of FIG. 6, M=2 for illustrative purposes.

Signals produced by video processor 542 are coupled to signal line 544 which is used to convey the control signals which control input switcher 605, output switcher 606, transmission rate reduction unit 100 and bit stuffing unit 200. Input switcher 605 provides N-to-1, N-to-2, and N-to-3 switching capabilities. Similarly, output switcher 606 provides 1-to-N, 2-to-N, and 3-to-N switching capabilities. The switching is controlled by control signals on signal line 544. These control signals are generated by the control processor 540. Control processor 540 has control capabilities for handling different transmission rates among a plurality of endpoint devices.

If the transmission rates among all the endpoint devices are the same, the control signals sent out by control processor 540 over signal line 544 serves to place video processor 542 into a switching mode. In such a case, video processor 542 works as a buffer and switcher, such that the input switcher provides an N-to-1 switch and the output provides an 1-to-(N-1) switch. A direct signal path between input switcher 605 and output switcher 606 is utilized, whereas video transmission rate reduction unit 100 and bit stuffing unit 200 are not used.

Figure 7:
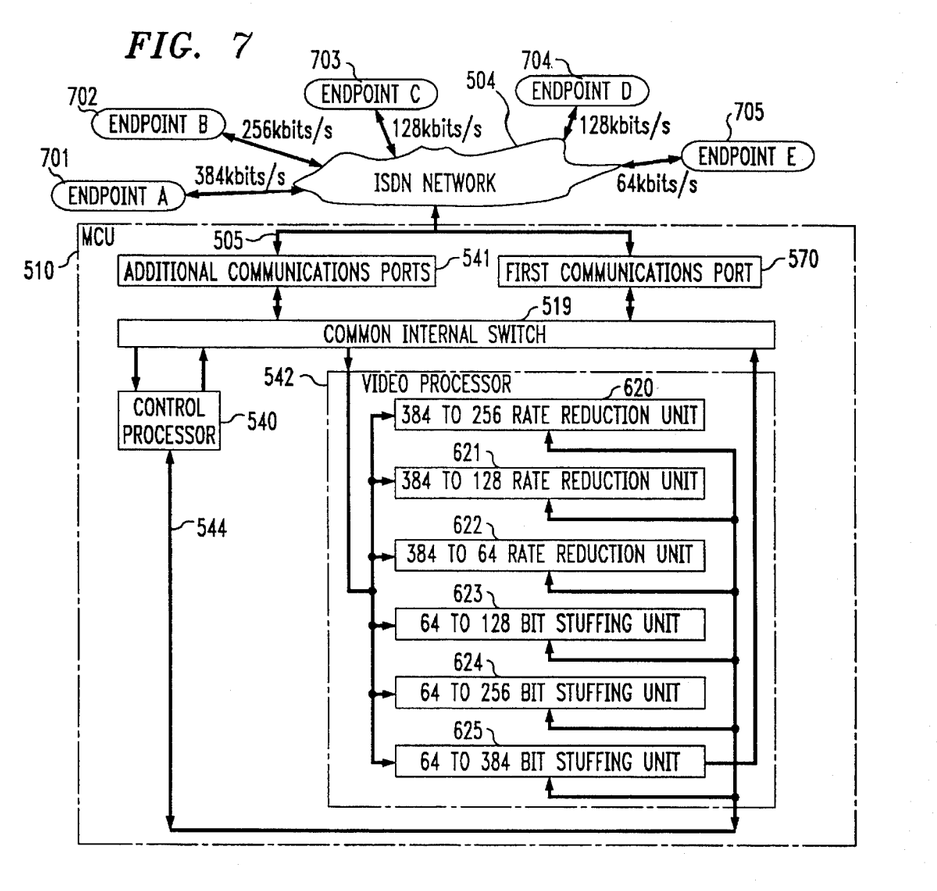
FIG. 7 is a hardware block diagram setting forth a bit rate matching system for use with five endpoint devices.

If the transmission rates among the endpoint devices are different, and if there are more than two different transmission rates among the endpoints, extra rate reduction units 100 and extra bit stuffing units 200 are needed in the video processor 542. As an example, FIG. 7 shows a video transmission bit rate matching system which uses five endpoint devices connected to an ISDN network 504 via a five-point connection wherein the switching functions of video processor 542 are integrated into common internal switch 519. The ISDN network 504 is connected to a five-port MCU 510, including first communications port 570 and additional communications ports 572. A first endpoint device, endpoint A 701, is connected to the ISDN network 504 via a 384 kbits/s communications link. A second endpoint device, endpoint B 702, is connected via a 256 kbits/s link. Third and fourth endpoint devices, endpoint C 703 and endpoint D 704, respectively, are each connected to ISDN network 504 via 128 kbits/s links, and a fifth endpoint device, endpoint E 705, is connected via a 64 kbits/s link. Therefore, the MCU 510 must utilize a video processor 542 having five inputs and five outputs. To produce five outputs with three different transfer rates, the video processor needs three rate reduction units 620, 621, 622, three bit stuffing units 623, 624, 625, and an optional video buffer. The three rate reduction units 620, 621, 622 provide respective rate reductions of 384-to-256 kbits/sec, 384to-128 kbits/sec, and 384-to-64 kbits/sec. The three bit stuffing units 623, 624, 625 provide respective bit stuffing conversions of 64to-128 kbits/sec, 64to-256 kbits/sec, and 64-to-384 kbits/sec.

To provide the proper switching for the inputs and the outputs, the control processor 540 has to provide proper control signals. If endpoint A 701 is used by the current conference speaker and endpoint B 702 is used by the conference speaker who spoke immediately prior to the speaker using endpoint A 701, then the common internal switch 519 provides an input switching function wherein 5 inputs are switched to 4 outputs, such that the coded bit stream from endpoint A 701 is switched to any one of the rate reduction units 620, 621, 622 which provide respective bit rate reductions of 384-to-256 kbits/sec, 384-to-128 kbits/ sec, and 384-to-64 kbits/sec. To send the picture of the previous speaker to endpoint A 701, the coded bit stream from endpoint B 702 is switched to bit stuffing unit 625, which performs a bit stuffing from a rate of 256 kbits/sec to a rate of 384 kbits/sec. Via the common internal switch 519, the output of rate reduction unit 620, which performs a bit rate reduction of 384 kbits/sec to 256 kbits/sec, is routed to endpoint B 702, the output of rate reduction unit 621, which performs a rate reduction of 384 kbits/sec to 128 kbits/sec. is routed to endpoints C and D, 703, 704, respectively, and the output of rate reduction unit 622, performing a reduction of 384-to-64 kbits/sec, is routed to endpoint E 705. The output of bit stuffing unit 625 (64-to-384 kbits/sec), is routed to endpoint A 701.

What is claimed:

1. A bit rate reduction apparatus including:

(a) a first inverse quantizer having an input and an output:

(b) a second inverse quantizer having an input and an output;

(c) a prediction frame store;

(d) a quantizer having an input and an output;

(e) processor means for performing computations on a plurality of motion vectors; each motion vector being represented by an X value and a Y value:

(f) motion vector memory means for storing a plurality of motion vectors, the plurality of motion vectors corresponding to at least one video image frame, the video image frame containing a plurality of macro blocks, each macro block being associated with a motion vector: and (g) first, second, and third summing devices; each summing device having a first input, a second input, and an output;

the first inverse quantizer adapted to accept an input signal including quantized DCT coefficients and quantization parameters, such that an output signal of reconstructed DCT coefficients is generated;

the processor means adapted to accept an input signal including motion vectors; such that an output signal of processed motion vectors is generated in response to the input signal of motion vectors;

the output signal being coupled to the prediction frame store;

the first inverse quantizer output signal coupled to the first input of the first summing device;

the prediction frame store generating an output signal including a motion-compensated drift error signal; the motion-compensated drift error signal being coupled to the second input of the first summing device;

the output of the first summing device being coupled to the quantizer input; the quantizer output being coupled to the second inverse quantizer input; the second inverse quantizer output being inverted and then coupled to the first input of the second summing device; the first inverse quantizer output being coupled to the second input of the second summing device; the output of the second summing device being coupled to the first input of the third summing device; the second input of the third summing device being coupled to the output signal of the prediction frame store; the output of the third summing device being coupled to the prediction frame store; the output of the quantizer comprising re-quantized DCT coefficients and new quantization parameters.

2. A compressed-domain bit rate reduction system wherein a first compressed video bit stream having a first transfer rate is converted in the compressed domain into a second compressed video bit stream having a second transfer rate slower than the first transfer rate, the system comprising:

(a) a video multiplex decoder for demultiplexing and decoding the first video bit stream to generate (i) quantized DCT coefficient microblocks representing a plurality of digitized frequency components for the first video bit stream, (ii) for each microblock, a motion vector pair, each motion vector pair including a first vector specifying a vertical displacement and a second vector specifying a horizontal displacement; and (iii) header information specifying a starting point for a compressed video image, compressed video image synchronization information, and the location of a given microblock or group of microblocks in the compressed video image;

(b) a DCT coefficients processor for receiving quantized DCT coefficient microblocks from the video multiplex decoder and receiving quantization information from a rate control processor to generate a set of processed DCT coefficient microblocks containing fewer DCT coefficients than the number of coefficients in the quantized DCT coefficient microblocks received from the video multiplex decoder;

(c) a video multiplex encoder for encoding requantized DCT coefficient microblocks obtained from the DCT coefficients processor, for encoding a motion vector obtained from the DCT coefficients processor, and for multiplexing header information with the encoded motion vector and encoded DCT coefficient microblocks to produce the second compressed video bit stream;

(d) a rate control processor providing control information for the DCT coefficients processor, the rate control processor comprising a processor for generating new quantization information for the DCT coefficients processor according to a transmission buffer status value specifying the number of available bits remaining in a video transmission buffer, and according to a desired bit rate for the second compressed video bit stream, wherein each microblock adjoins another microblock at a microblock boundary, and wherein said DCT coefficients processor further includes:

(a) a first inverse quantizer which, in response to the receipt of the quantized DCT coefficient microblocks and the original quantization information from the video multiplex decoder, produces an output in the form of reconstructed DCT coefficient microblocks according to the quantization information;

(b) a quantizer which accepts the reconstructed DCT coefficient microblocks and a DCT feedback signal to produce requantized DCT coefficient microblocks according to the new quantization information obtained from the rate control processor;

(c) a second inverse quantizer which receives the requantized DCT coefficient microblocks and produces reconstructed DCT coefficients based upon the new quantization information;

(d) a prediction frame storage device which stores at least one frame, each frame including a plurality of DCT coefficient microblocks, and which generates a DCT feedback signal based upon the DCT coefficient microblocks stored in the frame storage device;

(e) a motion vector processor which receives a plurality of motion vector pairs from the video multiplex decoder and processes the motion vector pairs such that respective processed motion vector pairs are placed at the corresponding DCT coefficient microblock boundary;

(f) a first summing device coupled to the output of the first inverse quantizer, the output of the frame storage device, and the input of the quantizer for adding the output of the first inverse quantizer and the DCT feedback signal from the output of the frame storage device to generate a sum, and applying the sum so generated to the input of the quantizer;

(g) a second summing device coupled to the first inverse quantizer and the second inverse quantizer for subtracting the output of the second inverse quantizer from the output of the first inverse quantizer to generate a DCT error signal, and for applying the DCT error signal to the input of a third summing device, and (h) a third summing device coupled to the second summing device and the frame storage device for performing motion compensation for the DCT error signal.

3. A compressed-domain bit rate reduction system as set forth in claim 2 wherein the third summing device adds the output of the second summing device to the output of the frame storage device and stores the sum in the frame storage device.

4. A compressed-domain bit rate reduction system as set forth in claim 2 wherein the output of the second summing device is coupled directly to the frame storage device, thereby bypassing the third summing device.

5. A compressed-domain bit rate reduction system as set forth in claim 2 wherein, for a set of intra-coded microblocks setting forth DCT coefficients for a current frame of a compressed video image, the DCT error signal from the output of the second summing device is stored in the prediction frame storage device.

6. A compressed-domain bit rate reduction system as set forth in claim 2 wherein, for a set of intercoded DCT coefficient microblocks corresponding to a given frame of a compressed video image, the DCT error signal from the second summing device is motion compensated in the coded domain based upon the processed motion vector pair to generate a set of improved DCT coefficient microblocks.

7. A compressed-domain bit rate reduction system as set forth in claim 6 wherein a displaced DCT error signal is generated by summing the DCT error signal from the second summing device with the set of improved DCT coefficient microblocks using the processed motion vector pair.

8. A compressed-domain bit rate reduction system as set forth in claim 2 wherein, for a set of intercoded DCT coefficient microblocks corresponding to a given frame of a compressed video image, the DCT error signal from the second summing device is motion compensated in the coded domain based upon the motion vector pair, and not the processed motion vector pair, to generate a set of improved DCT coefficient microblocks.

9. A compressed-domain bit rate reduction system as set forth in claim 8 wherein a displaced DCT error signal is generated by summing the DCT error signal from the second summing device with the set of improved DCT coefficient microblocks using the motion vector pair obtained from the video multiplex decoder, and not using the processed motion vector pair.

10. A compressed-domain bit rate reduction system as set forth in claim 2 wherein, for a set of DCT coefficient microblocks that are intra-coded, the output of the first inverse quantizer is coupled to the input of the quantizer, thereby bypassing the first summing device.

11. A compressed-domain bit rate reduction system as set forth in claim 2 wherein, for a set of DCT coefficient microblocks that are inter-coded, the output of the first inverse quantizer is added to the output of the frame storage device and the sum is applied to the input of the quantizer.

12. A compressed-domain bit rate reduction system as set forth in claims 3, 4, 5, 9, 10, or 11 wherein said DCT coefficients processor further includes:

(a) a first inverse quantizer which, in response to the receipt of the quantized DCT coefficient microblocks and the quantization information from the video multiplex decoder, produces an output in the form of reconstructed DCT coefficient microblocks according to the quantization information;

(b) a quantizer which accepts the reconstructed DCT coefficient microblocks and a DCT feedback signal to produce requantized DCT coefficient microblocks according to the new quantization information obtained from the rate control processor;

(c) a second inverse quantizer which receives the requantized DCT coefficient microblocks and produces reconstructed DCT coefficients based upon the new quantization information;

(d) a prediction frame storage device which stores a frame including a plurality of DCT coefficient microblocks, and which generates a DCT feedback signal based upon the DCT coefficient microblocks stored in the frame storage device;

(e) a first summing device coupled to the output of the first inverse quantizer, the output of the frame storage device, and the input of the quantizer for adding the output of the first inverse quantizer and the DCT feedback signal from the output of the frame storage device to generate a sum, and applying the sum so generated to the input of the quantizer;

(f) a second summing device coupled to the first inverse quantizer and the second inverse quantizer for subtracting the output of the second inverse quantizer from the output of the first inverse quantizer to generate a DCT error signal, and for applying the DCT error signal to the input of a third summing device; and (g) a third summing device coupled to the second summing device and the frame storage device for performing motion compensation for the DCT error signal.

13. A DCT coefficients processor for use in a compressed-domain bit rate reduction system wherein a first set of quantized DCT coefficient microblocks is converted into a second set of quantized DCT coefficient microblocks in the compressed domain, the second set of quantized DCT coefficient microblocks having fewer DCT coefficients than the first set of quantized DCT coefficient microblocks, the DCT coefficients processor comprising a processing device for receiving the first set of quantized DCT coefficient microblocks and quantization information to generate the second set of quantized DCT coefficient microblocks, the DCT coefficients processor further including:

(a) a first inverse quantizer which, in response to the receipt of the quantized DCT coefficient microblocks and the quantization information, produces an output in the form of reconstructed DCT coefficient microblocks according to the quantization information;

(b) a quantizer which accepts the reconstructed DCT coefficient microblocks and a DCT feedback signal to produce requantized DCT coefficient microblocks in response to the receipt of new quantization information;

(c) a second inverse quantizer which receives the requantized DCT coefficient microblocks and produces reconstructed DCT coefficients based upon the new quantization information;

(d) a prediction frame storage device which stores a frame including a plurality of DCT coefficient microblocks, and which generates a DCT feedback signal based upon the DCT coefficient microblocks stored in the prediction frame storage device;

(e) a motion vector processor which is equipped to receive a plurality of motion vector pairs and to process the motion vector pairs such that respective processed motion vector pairs are placed within corresponding DCT coefficient microblocks;

(f) a first summing device coupled to the output of the first inverse quantizer, the output of the frame storage device, and the input of the quantizer for adding the output of the first inverse quantizer and the DCT feedback signal from the output of the frame storage device to generate a sum, and applying the sum so generated to the input of the quantizer;

(g) a second summing device coupled to the first inverse quantizer and the second inverse quantizer for subtracting the output of the second inverse quantizer from the output of the first inverse quantizer to generate a DCT error signal, and for applying the DCT error signal to the input of a third summing device; and (h) a third summing device coupled to the second summing device and the frame storage device for performing motion compensation for the DCT error signal.

* * * * *